United States Patent
Lee et al.

(10) Patent No.: US 7,094,031 B2
(45) Date of Patent: Aug. 22, 2006

(54) OFFSET CORIOLIS TURBULATOR BLADE

(75) Inventors: Ching-Pang Lee, Cincinnati, OH (US); Wenfeng Lu, Mason, OH (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 10/937,461

(22) Filed: Sep. 9, 2004

(65) Prior Publication Data

US 2006/0051208 A1  Mar. 9, 2006

(51) Int. Cl.
*F01D 5/18* (2006.01)
(52) U.S. Cl. .................................... 416/97 R
(58) Field of Classification Search ........ 415/115–116; 416/96 R, 96 A, 97 R
See application file for complete search history.

(56) References Cited

U.S. PATENT DOCUMENTS

| | | |
|---|---|---|
| 3,672,787 A | 6/1972 | Thorstenson |
| 4,514,144 A | 4/1985 | Lee |
| 4,775,296 A | 10/1988 | Schwarzmann et al. |
| 5,395,212 A * | 3/1995 | Anzai et al. ............. 416/97 R |
| 5,681,144 A * | 10/1997 | Spring et al. ............. 416/97 R |
| 5,700,132 A | 12/1997 | Lampes et al. |
| 5,797,726 A | 8/1998 | Lee |
| 5,967,752 A | 10/1999 | Lee et al. |
| 6,174,134 B1 * | 1/2001 | Lee et al. ................ 416/97 R |
| 6,331,098 B1 | 12/2001 | Lee |
| 6,406,260 B1 * | 6/2002 | Trindade et al. .......... 416/96 R |

\* cited by examiner

*Primary Examiner*—Christopher Verdier
(74) *Attorney, Agent, or Firm*—Stephen H. Friskney; Francis L. Conte (57) ABSTRACT

A turbine rotor blade includes an airfoil having pressure and suction sidewalls extending longitudinally in span from root to tip. The sidewalls are spaced apart between leading and trailing edges and joined together by longitudinal partitions defining flow channels therein. Rows of first and second slant turbulators extend from one of the sidewalls in one of the channels and are offset longitudinally. The first and second turbulators overlap chordally to eliminate an axial gap therebetween while maintaining a radial gap for tripping cooling air channeled along the span of the channel.

28 Claims, 5 Drawing Sheets

OFFSET CORIOLIS TURBULATOR BLADE

BACKGROUND OF THE INVENTION

The present invention relates generally to gas turbine engines, and, more specifically, to turbine rotor blades therein.

A typical gas turbine engine includes several rows or stages of turbine rotor blades which extract energy from hot combustion gases for rotating the corresponding turbine disks from which they extend. A high pressure turbine powers an upstream compressor, and a low pressure turbine typically powers an upstream fan in an aircraft turbofan engine application.

Air is pressurized in the compressor and mixed with fuel in a combustor for generating the hot combustion gases which flow through the turbine stages. A portion of the pressurized air is bled from the compressor for cooling the turbine blades for ensuring long life thereof.

More specifically, turbine blades have hollow airfoils with various cooling circuits therein for accommodating the different heat loads over the concave pressure and convex suction sides thereof which extend between opposite leading and trailing edges. The cooling air is delivered to the supporting dovetail of the blade and channeled radially outwardly through the dovetail and platform through the root of the airfoil and radially outwardly to its outer tip.

The leading edge of the airfoil first receives the hot combustion gases in the turbine flowpath, and typically requires a dedicated cooling circuit therefor. The trailing edge of the airfoil is relatively thin and typically includes a dedicated cooling circuit therefor. And, the midchord region of the airfoil typically includes multiple cooling legs or channels specifically configured for cooling this region of the airfoil.

The prior art is crowded with various cooling circuits and cooling features for cooling turbine rotor blades from root to tip and between the leading and trailing edges. The internal cooling circuits may be single radial flow channels typically along the leading and trailing edges, with multiple flow channels in between typically in the form of multi-pass serpentine flow channels.

Short turbulator ribs are typically found in the various internal flow channels of the airfoil for tripping the cooling air coolant to increase its heat transfer coefficient for improving cooling efficiency. The turbulators are typically in the form of straight ribs extending horizontally or along the chord axis of the airfoil, or they may be inclined relative thereto.

As the air flows radially outwardly and radially inwardly through the various flow channels inside the turbine airfoil heat is extracted from the metal sidewalls thereof for providing local cooling, with the cooling air then being discharged through various apertures throughout the airfoil. For example, the sidewalls of the airfoil typically include inclined film cooling holes which discharge the spent cooling air in corresponding films for providing a thermally insulating cooling air blanket over the external surface of the pressure and suction sidewalls as required.

The leading edge may have specialized showerhead holes, and the trailing edge may have various forms of trailing edge discharge holes. And, the tip of the airfoil typically includes additional outlet holes in the floor of the tip cavity thereof for additionally discharging the air from the internal cooling circuits.

Although stator nozzle vanes and turbine rotor blades may share in general various cooling circuits therein including film cooling holes and internal turbulators, the turbine blades operate under centrifugal force due to rotation thereof. Centrifugal force acts on the coolant being channeled through the circuits inside the airfoil and affects the cooling performance thereof.

The combination of the radial velocity of the coolant inside the flow channels of the airfoil and the rotary speed of the blade atop its supporting rotor disk creates a Coriolis force on the coolant which introduces secondary flow fields in the form of small vortices in addition to the main radial direction of the coolant. The Coriolis force affects heat transfer of the coolant as it is tripped by the internal turbulators of the airfoil.

In U.S. Pat. No. 5,797,726 and U.S. Pat. No. 6,331,098 preferred orientations of the turbulators are disclosed for enhancing cooling performance in conjunction with the Coriolis force. These patents include specifically slanted turbulators along the pressure and suction sides of the airfoil, and additional chevron turbulators having small clearances or gaps therein.

The relatively long slant turbulators cooperate with the Coriolis force on the coolant to enhance heat transfer along the length of the those turbulators. The chevron turbulators enjoy enhanced heat transfer when specifically used in conjunction with the Coriolis force, interrupted only by the axial gap within the chevron pair.

In both configurations, the short-height turbulators are integrally cast in the airfoil during the original manufacture thereof and are subject to typical manufacturing casting tolerances. The turbulators are relatively low and relatively narrow in the exemplary range of about 10–30 mils, and the gaps in the chevron turbulators may also be in this exemplary size range. Excessively sized gaps decreases the heat transfer effectiveness of the chevron turbulators, and narrow gaps are difficult to cast and also affect performance of the turbulators.

Accordingly, it is desired to provide a turbine rotor blade with improved turbulators for enhanced performance under the Coriolis force.

BRIEF DESCRIPTION OF THE INVENTION

A turbine rotor blade includes an airfoil having pressure and suction sidewalls extending longitudinally in span from root to tip. The sidewalls are spaced apart between leading and trailing edges and joined together by longitudinal partitions defining flow channels therein. Rows of first and second slant turbulators extend from one of the sidewalls in one of the channels and are offset longitudinally. The first and second turbulators overlap chordally to eliminate an axial gap therebetween while maintaining a radial gap for tripping cooling air channeled along the span of the channel.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
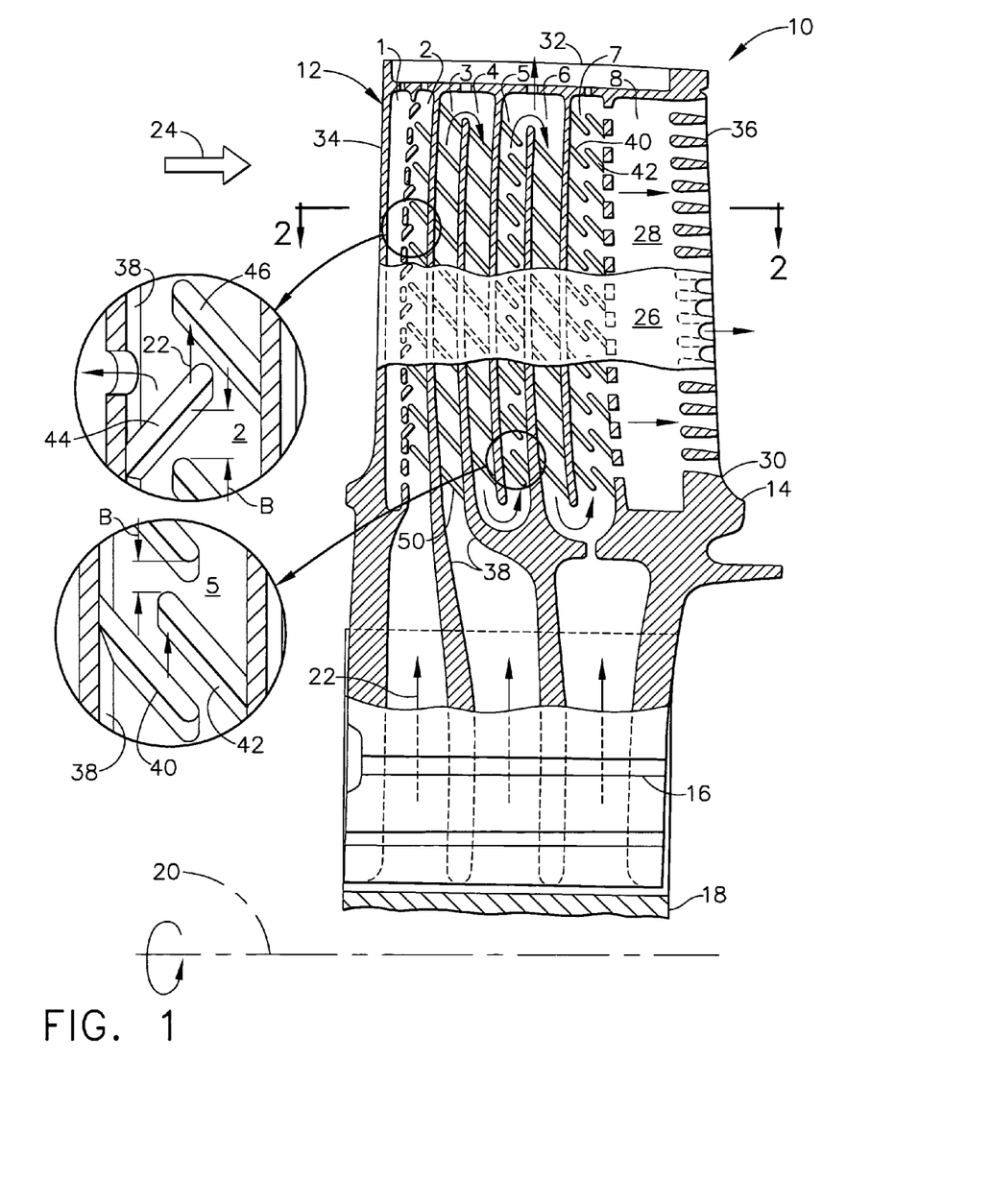
FIG. 1 is a partly sectional, elevational view of an exemplary first stage turbine motor blade.

Illustrated in FIG. 1 is an exemplary first stage turbine rotor blade 10 for a gas turbine engine. The blade includes an airfoil 12, inner platform 14, and lower dovetail 16 integrally formed together in a unitary or one-piece casting.

The dovetail 16 is in the exemplary form of an axial-entry dovetail having multiple dovetail tangs or lobes which mate in a corresponding dovetail slot in the perimeter of turbine rotor disk 18, shown in part. The disk has an axial centerline axis 20 about which the disk rotates during operation, with a full row of the turbine blades 10 extending radially outwardly from the perimeter of the disk.

During operation, air 22 is pressurized in a compressor (not shown), and some of which is suitably delivered to the turbine blades for internal cooling thereof. Most of the pressurized air from the compressor is mixed with fuel in a combustor (not shown) and ignited for generating hot combustion gases 24 which are discharged from the combustor into the various rows or stages of the typical high and low pressure turbines disposed downstream therefrom.

Figure 2:
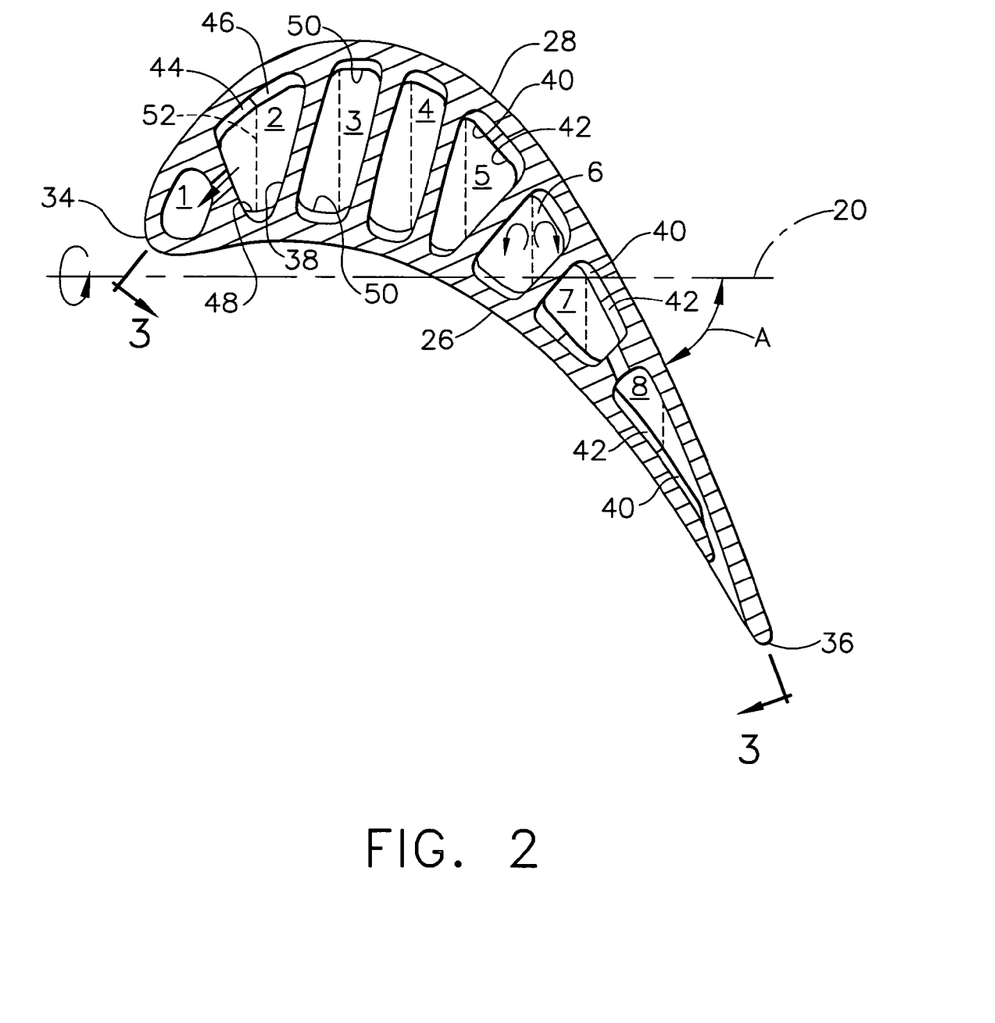
FIG. 2 is a radial sectional view through the airfoil of the blade illustrated in FIG. 1 and taken along line 2—2.
Figure 3:
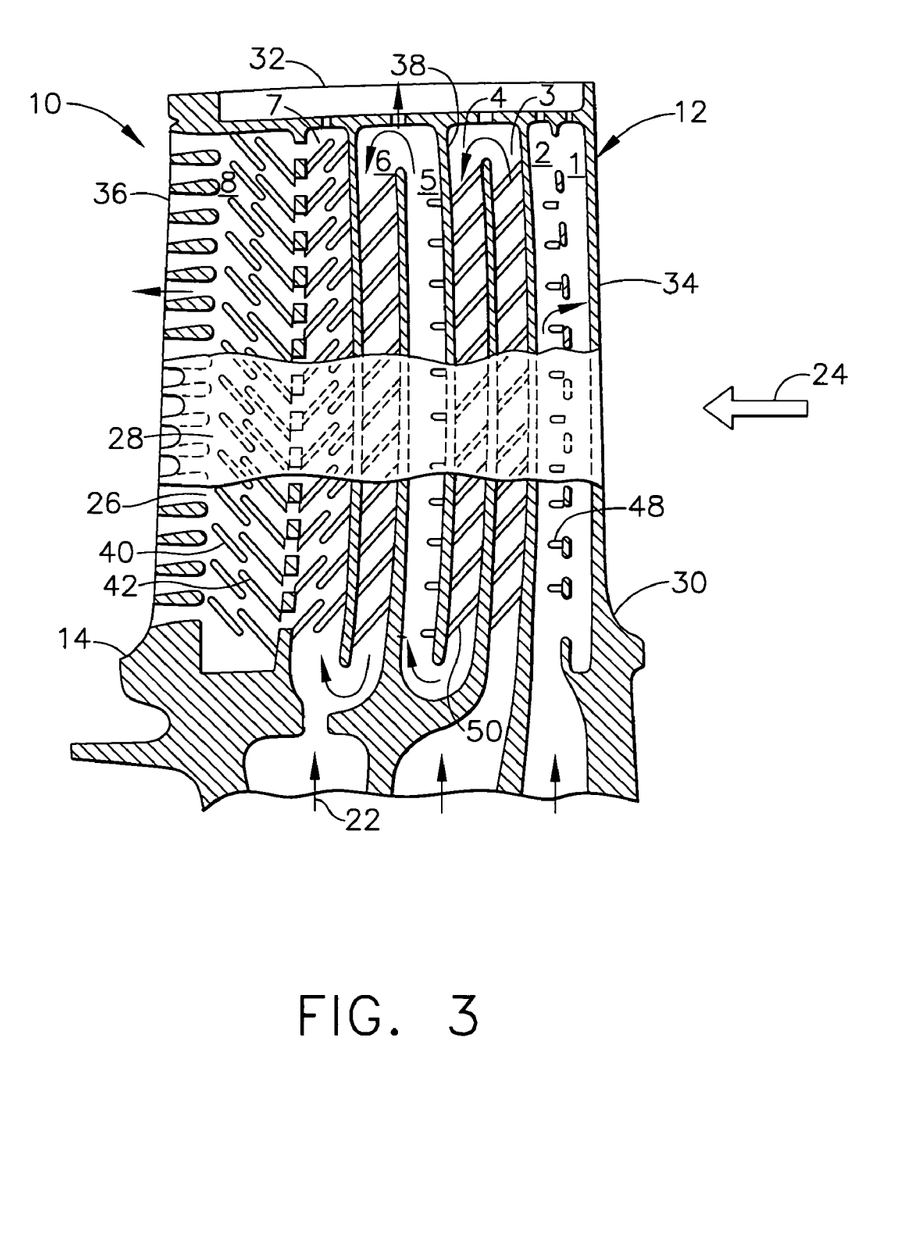
FIG. 3 is an axial sectional view through the airfoil illustrated in FIG. 2 and taken along line 3—3.

The first stage turbine airfoil illustrated in FIGS. 1–3 includes a generally concave pressure sidewall 26 and a circumferentially opposite, generally convex, suction sidewall 28 extending longitudinally in radial span from a root 30 at the platform 14 to an outer tip 32 at the distal end thereof.

The two sidewalls 26,28, as best illustrated in FIG. 2, are spaced circumferentially or laterally apart between the leading and trailing edges 34,36 and are integrally joined together by a plurality of chordally spaced apart radial partitions 38 extending longitudinally between the root 30 and the tip 32 to define a plurality of radial flow legs or channels 1-8 for channeling the coolant air 22 therethrough.

In the exemplary embodiment illustrated in FIGS. 1–3 there are seven internal partitions 38 which define eight internal flow channels 1–8 located in turn from the leading edge to the trailing edge. The first partition includes a row of impingement holes for impingement cooling the back side of the leading edge in the first channel 1. The trailing edge includes row of trailing edge outlet holes in the pressure side for discharging spent cooling air from the trailing edge channel 8.

The two sidewalls of the airfoil may include various rows of film cooling holes (not shown) for discharging spent cooling air from inside the airfoil into corresponding thermally insulating films of air over the external surface of the airfoil for additional heat protection. In particular, the leading edge of the airfoil may include various rows of showerhead holes (not shown) for locally tailoring cooling of the leading edge of the airfoil first subject to the hot combustion gases from the combustor. And, the floor of the recessed tip cavity typically includes additional outlet holes therein for discharging air from the internal cooling circuits.

The internal cooling circuits of the airfoil may have any conventional configuration such as the dedicated leading edge channel 1 and trailing edge channel 8. The midchord region of the airfoil is cooled by a five-pass serpentine cooling circuit defined by channels 3,4,5,6, and 7. The serpentine circuit receives cooling air through the dovetail in channels 3 and 7, and the spent cooling air is discharged through the tip holes and a row of holes in the partition joining channel 8 for providing cooling air thereto.

As shown in FIG. 2, the blade has a substantial amount of twist in which the trailing edge 36 is circumferentially offset from the leading edge 34. The twist angle A may be measured between the suction sidewall and the rotary centerline axis 20 as viewed in FIG. 2 and may be quite substantial based on the specific aerodynamic requirements of the turbine blade.

The blade twist affects the position and orientation of the several flow channels 1–8 in the airfoil, and correspondingly affects performance of the cooling air being channeled through the flow channels. More specifically, as indicated above the Coriolis force acts on the coolant 22 in a direction perpendicular to the radial flow thereof according to the vector product of the radial velocity of the outwardly or inwardly directed coolant flow through the respective radial flow channels and the rotary speed of the blade about the axial centerline axis of the disk. Accordingly, the Coriolis force acts on the coolant in opposite directions in an outward flow pass or channel as opposed to an inward flow pass or channel.

In both examples, however, the Coriolis force is effective for generating a pair of Coriolis vortices in the coolant 22 which counter rotate in each radial flow channel as a secondary flow field to the primary radially directed flow of the coolant. Each channel thusly develops a corresponding axially forward Coriolis vortex and an axially aft Coriolis vortex which rotate counter to each other, and with different rotation in the inward and outward passes of the flow channels.

Since the different flow channels 1–8 have different configurations and orientations they may be differently configured for maximizing the cooling effectiveness of the coolant 22. The different channels may use different forms of conventional turbulators and new turbulators for enhancing heat transfer and improving operation under the Coriolis force as further described hereinbelow.

For example, at least one of the channels, such as channels 2,5,7 includes two columns or vertical rows of slant ribs or turbulators extending normally inward in short height from a common one of the two sidewalls 26,28. For example, the fifth channel 5 includes a row of first slant turbulators 40 and a cooperating row of second slant turbulators 42 extending inwardly from the inner surface of the common suction sidewall 28. The corresponding turbulators 40,42 have a longitudinal spacing or offset B, and each of the first turbulators 40 in one row chordally overlaps an opposite second turbulator 42 in the other row without any axial or chordal gap therebetween.

The first and second turbulators 40,42 thusly alternate from and terminate short of opposite partitions 38 along the airfoil span with a pitch spacing between successive first and second turbulators which is preferably substantially uniform or equal along the flow channel. In the preferred embodiment, the first and second turbulators may be spaced in span with an equal pitch, whereas in alternate embodiments the pitch spacing of the turbulators may be varied as desired.

As shown in FIGS. 1–3, the fifth, seventh, and eighth channels 5,7,8 may similarly use one form of the first and second slant turbulators 40,42 being parallel to each other for tailoring the heat transfer performance thereof in conjunction with the Coriolis force.

Another form of the first and second slant turbulators, designated 44,46 are found in the second channel 2 as illustrated in FIGS. 1 and 2 and are similar to the parallel embodiment of the turbulators, but instead are oblique to each other in the form of a longitudinally offset chevron. The chevron turbulators 44,46 are disposed on the suction sidewall 28 and cooperate with a row of horizontal or chordal turbulators 48, without slant, on the opposite pressure sidewall 26 as further described hereinbelow.

The parallel and oblique forms of the slant turbulators extend only in part along the axial width of the respective flow channels and are contrasted with conventional slant turbulators 50 used where appropriate in the various flow channels according to conventional practice which extend the full width of the corresponding flow channels. The various forms of the slant turbulators may be conventional in shape or configuration and width and height, and vary in length and configuration as described herein for improving heat transfer in conjunction with the Coriolis force in each of the differently configured flow channels.

For example, the narrow third, fourth, and sixth flow channels 3,4,6 may use the conventional long slant turbulators 50 in accordance with standard practice as explained in the two patents identified above in the Background section. In contrast, the differently configured second, fifth, seventh, and eighth flow channels 2,5,7,8 permit the introduction of the newly configured shorter slant turbulators 40–46 in either parallel or oblique orientations for enhancing the heat transfer cooling under the Coriolis force.

For example, the two forms of the first turbulators 40,44 in their respective flow channels are substantially identical to each other in shape, length, height, and width. And, similarly the two forms of the second slant turbulators 42,46 are substantially identical to each other in their corresponding flow channels.

In each flow channel, the first turbulators preferably have a substantially uniform or common length, and the second turbulators also preferably have a substantially uniform or common length for maintaining the uniformity of cooling in the respective flow channels.

In both embodiments illustrated in FIG. 1, the first turbulators 40,44 extend straight in length from one partition past the midplane or middle of the flow channel in which they are disposed, and correspondingly the second turbulators 42,46 also extend straight in length from the opposite partition of the common flow channel past the same midplane therein.

In this way, the first and second turbulators overlap each other along the chord axis of the airfoil without any axial gap therebetween, and are offset longitudinally along the span of the airfoil for providing a radial gap therebetween. Each of the first turbulators terminates short of the opposite partition leaving a void therebetween. Similarly, each of the second turbulators terminates short of its opposite partition leaving another void therebetween.

Accordingly, the cooperating pairs of turbulators 40,42 alternate along the span of each flow channel and extend oppositely from the opposite partitions defining each flow channel to increase the effective coverage of the parallel turbulators while additionally including a radial gap for promoting additional tripping or turbulence in the secondary flow due to the Coriolis force. Instead of using a single continuous slant turbulator, like turbulator 50, across the full width of the flow channel, the single turbulator instead may be replaced by a corresponding pair of the first and second turbulators 40,42 offset longitudinally in pitch spacing while overlapping chordally in the axial direction of the airfoil.

The amount of axial overlap between the first and second turbulators may be varied for cooperating with the Coriolis force in the secondary flow field without introducing excessive pressure losses in the main radial flow of the coolant through the flow channels. For example, the axial overlap may be as little as zero in magnitude, and as large as practical to improve heat transfer. The lengths of the first and second turbulators may be equal to each other, or different, or may alternate from long to short placing the overlapping distal ends of the turbulators either at the channel midplane, or on opposite sides thereof.

The orientation or slant direction of the various turbulators illustrated in FIGS. 1–3 conforms with the teachings of the two patents described above for cooperating with the Coriolis force. For example, the two rows of turbulators 40,42 in the fifth and seventh flow channels 5,7 illustrated in FIG. 1 are substantially parallel to each other, and slant inwardly toward the root 30 and trailing edge 36. Similarly, the conventional slant turbulators 50 in the third, fourth, and sixth flow channels are also slanted in the same direction. The angle of slant may be conventional for all the turbulators in the airfoil, and an exemplary slant angle of about 45 degrees is illustrated.

The oblique or offset chevron form of the first and second slant turbulators 44,46 as illustrated in FIG. 1 are preferably perpendicular to each other using the exemplary 45 degree orientation. Furthermore, the chevron turbulators 44,46 preferably have a substantially uniform longitudinal offset or spacing B with a substantially equal longitudinal pitch.

The choice of the parallel turbulators 40,42 or the chevron turbulators 44,46 may be selected based on available space and the specific configuration of the flow channels and their relative location in the airfoil based on the amount of twist angle A experienced by the airfoil as illustrated in FIG. 2.

For example, the second flow channel 2 has a triangular cross section in the radial plane illustrated in FIG. 2, with a longer base disposed along the common suction sidewall 28, and a narrow apex disposed along the opposite pressure sidewall 26.

A construction line 52 may be disposed normal to the centerline axis 20 and is used to evaluate the symmetry of the several flow channels in the radial cross section illustrated for selecting the appropriate form of the slant turbulator in either conventional or new practice in accordance with the present disclosure.

Since the triangular second channel illustrated in FIG. 2 may be symmetrically bisected by the construction line 52, the twin Coriolis vortices generated therein may be matched to the use of the offset chevron turbulators 44,46 having the overlap thereof disposed along the construction line.

However, since the apex of the triangular second channel is relatively narrow and has little surface area along the opposite pressure sidewall 26, the short horizontal turbulator 48 is preferably used at this location without any slant. Since the twin Coriolis vortices rotate counter to each other, the use of the horizontal turbulator 48 will minimize adverse performance of attempting to align a conventional slant turbulator with either one or the other of the Coriolis vortices. A slant turbulator on the pressure sidewall cannot be aligned with both counterrotating Coriolis vortices at the same time, and the random nature of the actual positions of the vortices renders the use of a slant turbulator at this location impractical.

In the offset chevron form of the turbulators 44,46 illustrated in FIG. 1, the two turbulators are oblique to each other and higher in elevation or span at the channel midplane than at the opposite partitions 38 from which they extend. In this way, the two slant turbulators 44,46 slant downwardly towards the airfoil root and both the leading and trailing edges from the middle of the flow channel.

In this configuration, the Coriolis force in the coolant generates twin counterrotating vortices which are locally tripped by the cooperating turbulators 44,46 for enhancing heat transfer. Since there is no axial gap between the cooperating turbulator 44,46 each turbulator has enhanced coverage and effects improved heat transfer. The radial offset between the cooperating turbulators 44,46 introduces a radial gap between the turbulators and an additional mechanism for increasing turbulence of both the primary and secondary flow fields.

Since the cooperating turbulators 44,46 are offset radially, that offset may be as large as practical and within the manufacturing tolerances of the casting process. The offset turbulators therefore do not require the precision casting placement for the conventional symmetrical chevron turbulators of the prior art in which the small axial gap is provided between the chevron pair.

The third, fourth, and sixth flow channels illustrated in FIG. 2 are generally rectangular and the corresponding construction lines 52 indicate that the counterrotating Coriolis vortices in each of these flow channels will cooperate with primarily only the opposite pressure and suction sides of the airfoil due to the exemplary twist angle A. Accordingly, these three flow channels may use the single long slant turbulators 50 of conventional design on both sidewalls thereof.

The construction line 52 for the seventh channel illustrated in FIG. 2 indicates that the counterrotating Coriolis vortices which develop on opposite sides thereof will affect both sidewalls 26,28. Accordingly, two rows of the first and second turbulators 40,42 are preferably disposed on both of the two sidewalls 26,28 in two sets extending along the one channel 7.

As shown in FIGS. 1 and 3, the two sets of turbulators 40,42 in the seventh channel slant radially inwardly towards the trailing edge 36 of the airfoil in accordance with conventional practice for enhancing the heat transfer due to the Coriolis force, but with the additional advantages of the longitudinally offset turbulator pairs 40,42 described above.

The construction line 52 illustrated in FIG. 2 for the eighth flow channel also indicates that the counterrotating Coriolis vortices will affect both sidewalls of the airfoil, but the eighth flow channel is relatively narrow as it converges to the thin trailing edge. Accordingly, the two rows of turbulators 40,42 are disposed solely on the pressure sidewall 26 in the eighth channel, and the suction sidewall 28 is devoid of any turbulators in the eighth channel.

The smooth inner surface of the suction sidewall 28 in the eighth channel is illustrated in FIG. 1, and FIG. 3 illustrates the two rows of slant turbulators 44,46 slanting radially inwardly toward the leading edge 34 on the opposite side of the eighth channel.

In the exemplary embodiment illustrated in FIGS. 1–3 the two rows of the first and second turbulators 40–46 in the parallel form or offset chevron form are disposed in fewer than all of the available flow channels. For example, the second, fifth, seventh, and eighth flow channels include these slant turbulators as described above for improving the heat transfer in the respective flow channels under the Coriolis force. The configuration of these channels permits sufficient surface area for using two sets of turbulator offset longitudinally and overlapping chordally without introducing excessive pressure losses therein.

The leading edge first flow channel 1 illustrated in FIG. 2 is relatively small and without turbulators of any kind, and relies instead on conventional impingement cooling. The third, fourth, and sixth flow channels due to their narrow configurations and angular orientations due to the twist angle A of the airfoil may use the conventional, full length slant turbulators 50 on the opposite sidewalls in accordance with conventional practice for maximizing heat transfer under the Coriolis force.

Figure 4:
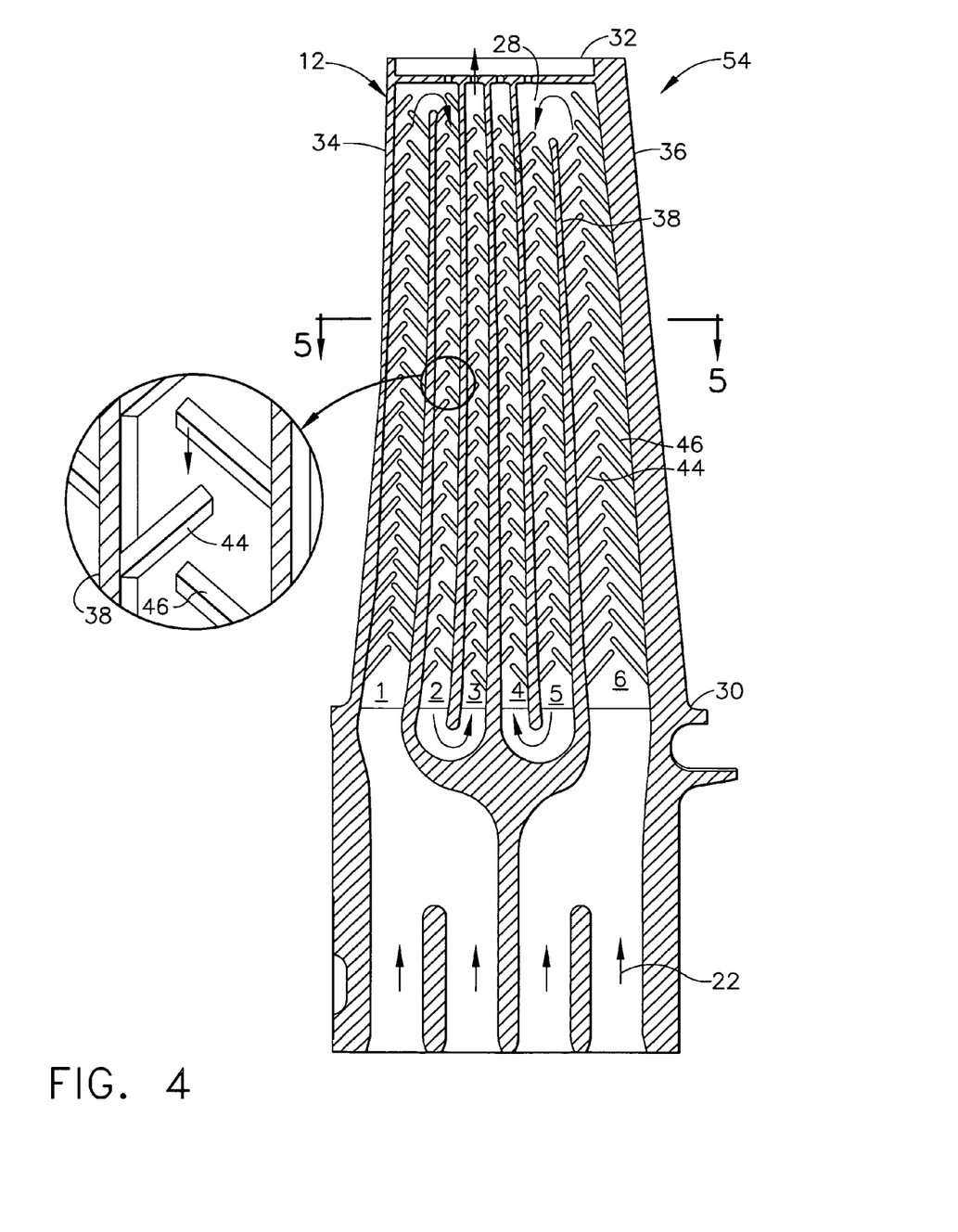
FIG. 4 is an axial sectional view of a second stage turbine rotor blade in accordance with another embodiment.
Figure 5:
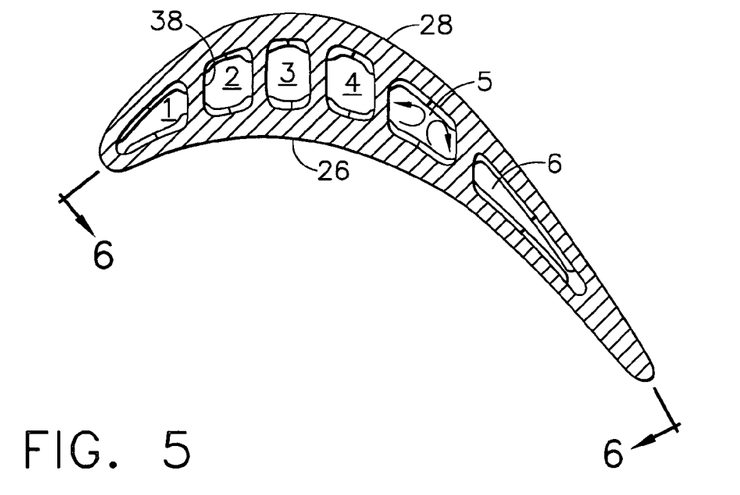
FIG. 5 is a radial sectional view through the airfoil of the blade illustrated in FIG. 4 and taken along line 5—5.
Figure 6:
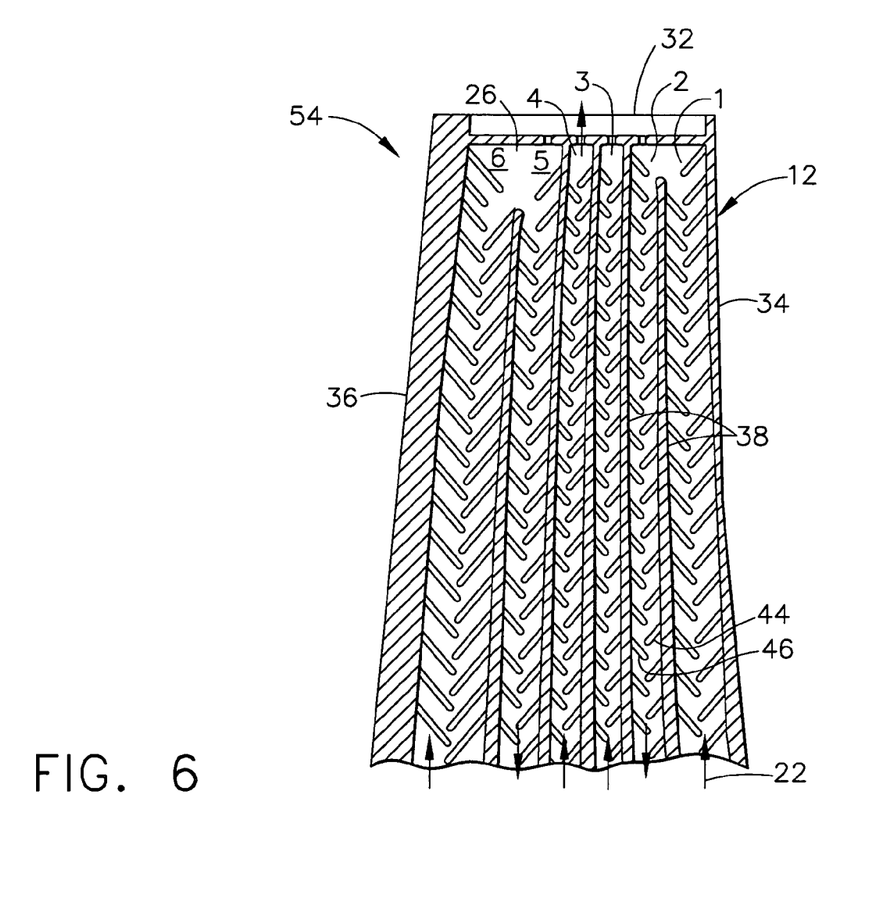
FIG. 6 is an elevational sectional view of the airfoil illustrated in FIG. 5 and taken along line 6—6.

FIGS. 4–6 illustrate an alternate embodiment of a turbine rotor blade 54 configured for the second stage in the high pressure turbine with the blade being longer than the first stage turbine rotor blade illustrated in FIGS. 1–3. In this embodiment, the second stage blade 54 includes five internal radial partitions 38 which form six internal radial flow channels 1–6.

The six flow channels may define conventional cooling circuits such as a three-pass serpentine cooling circuit using channels 1,2, and 3; and another three-pass serpentine cooling circuit using channels 6,5, and 4 for channeling the incoming cooling air in these numerical sequences.

The offset chevron form of the first and second turbulators 44,46 may be used in all six of the flow channels in this blade, and in cooperating sets on both sidewalls 26,28.

The offset turbulators 44,46 in the stage two embodiment are also oblique to each other, and perpendicular in the exemplary embodiment illustrated, and are suitably configured for enhancing heat transfer under the Coriolis force, and the corresponding twist angle of this blade.

Also in the stage two embodiment, the first and second turbulators 44,46 on the suction sidewall 28 of the airfoil as illustrated in FIG. 4 are higher in span at the midplanes of the respective flow channels than at the opposite partitions 38. Correspondingly, the first and second turbulators 44,46 on the pressure sidewall 26 as illustrated in FIG. 6 are lower in span at the midplanes of the respective flow channels than at the opposite partitions 38.

This orientation of the offset chevron turbulators 44,46 on the opposite sidewalls of the airfoil enhances heat transfer under the Coriolis force acting on the coolant 22 without any axial gaps between the cooperating turbulator pairs. The offset turbulators have increased length limited only by the spacing between the cooperating pair of turbulators where they would otherwise intersect but for the longitudinal spacing therebetween. The differently slanted turbulators cooperate with the corresponding counterrotating Coriolis vortices for enhancing heat transfer as well as providing additional turbulence as the coolant is channeled radially through the several flow channels, with enhanced secondary flow fields due to the offset turbulators.

The various embodiments disclosed above indicate that the simple introduction of longitudinally offsetting short slant turbulators while maintaining chordal overlap therebetween without axial gaps may be used to advantage for increasing heat transfer of the coolant circulated through the flow channels of the turbine airfoils, especially under the Coriolis force generated during rotary operation of the turbine rotor blades. The various forms of the offset parallel and chevron turbulators disclosed above may be conveniently manufactured in the original casting of the turbine airfoils within the conventional manufacturing tolerances of the casting process.

The various parameters of the offset turbulators may be adjusted for each of the different flow channels and the different configurations thereof for maximizing heat transfer in the coolant, especially under the Coriolis force. Although two rows of slant turbulators are disclosed for an individual channel, more rows could be used where space permits along either sidewall.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which

We claim:

1. A turbine rotor blade comprising:
    an airfoil, platform, and dovetail integrally joined together;
    said airfoil including pressure and suction sidewalls extending longitudinally in span from a root at said platform to a tip;
    said sidewalls being spaced laterally apart between leading and trailing edges and joined together by chordally spaced apart partitions extending longitudinally between said root and tip to define a plurality of outward and inward flow channels for channeling a coolant therethrough longitudinally outwardly from said root to tip and longitudinally inwardly from said tip to said root, respectively; and
    one of said outward channels includes a forward row of first slant turbulators extending from said suction sidewall and all said first turbulators being substantiallys identical to each other in said forward row, and an aft row of substantially identical second slant turbulators extending from said suction sidewall and offset longitudinally and overlapping chordally said first turbulators, and said second turbulators slant longitudinally inwardly toward said root and said trailing edge.

2. A blade according to claim 1 wherein said first and second turbulators alternate from and terminate short of opposite partitions along said airfoil span.

3. A blade according to claim 2 wherein said first turbulators are substantially parallel with said second turbulators.

4. A blade according to claim 2 wherein said first turbulators are oblique to said second turbulators.

5. A blade according to claim 2 wherein:
    said one channel has a triangular cross section, with a longer base disposed along said suction sidewall, and a narrow apex disposed along said pressure sidewall; and
    said one channel further includes a row of horizontal turbulators along said apex.

6. A blade according to claim 5 wherein said first and second turbulators are substantially parallel to each other, and slant inwardly toward said root and said trailing edge.

7. A blade according to claim 5 wherein said first and second turbulators are oblique to each other and higher in span at said channel midplane than at said partitions.

8. A blade according to claim 2 wherein said rows of first and second turbulators are disposed on both of said sidewalls extending into said one channel.

9. A blade according to claim 2 wherein said first and second turbulators are oblique to each other in a chevron configuration and disposed on both said pressure and suction sidewalls in said one channel, and said chevron turbulators in said one channel are slanted oppositely to each other on said sidewalls.

10. A blade according to claim 2 wherein said rows of first and second turbulators are disposed in fewer than all of said flow channels.

11. A turbine rotor blade comprising:
    an airfoil, platform, and dovetail integrally joined together;
    said airfoil including pressure and suction sidewalls extending longitudinally in span from a root at said platform to a tip;
    said sidewalls being spaced laterally apart between leading and trailing edges and joined together by chordally spaced apart partitions extending longitudinally between said root and tip to define a plurality of outward and inward flow channels for channeling a coolant therethrough longitudinally outwardly from said root to tip and longitudinally inwardly from said tip to root, respectively;
    at least one of said outward channels including forward and aft rows of first and second slant turbulators extending from said suction sidewall, and being offset longitudinally;
    all of said first turbulators in said forward row extend aft toward said trailing edge to chordally overlap an opposite second turbulator in said aft row, and said second turbulators slant longitudinally inwardly toward said root and said trailing edge.

12. A blade according to claim 11 wherein said first turbulators are substantially identical to each other; and said second turbulators are substantially identical to each other.

13. A blade according to claim 11 wherein said first turbulators have a substantially uniform length, and said second turbulators have a substantially uniform length.

14. A blade according to claim 11 wherein said first turbulators extend in length from one partition past the midplane of said one channel, and said second turbulators extend in length from an opposite partition past said midplane.

15. A blade according to claim 14 wherein said first turbulators are substantially parallel with said second turbulators.

16. A blade according to claim 15 wherein said first and second turbulators alternate in pitch spacing substantially uniformly along said one channel.

17. A blade according to claim 14 wherein said first turbulators are oblique to said second turbulators.

18. A blade according to claim 17 wherein said first turbulators are perpendicular to said second turbulators.

19. A blade according to claim 18 wherein said first and second turbulators alternate in pitch spacing substantially uniformly along said one channel.

20. A blade according to claim 14 wherein:
    said one channel has a triangular cross section, with a longer base disposed along said suction sidewall, and a narrow apex disposed along said pressure sidewall; and
    said one channel further includes a row of horizontal turbulators along said apex.

21. A blade according to claim 20 wherein said first and second turbulators are substantially parallel to each other, and slant inwardly toward said root and said trailing edge.

22. A blade according to claim 20 wherein said first and second turbulators are oblique to each other and higher in span at said channel midplane than at said partitions.

23. A blade according to claim 14 wherein said rows of first and second turbulators are disposed on both of said sidewalls extending into said one channel.

24. A blade according to claim 14 wherein said first and second turbulators are oblique to each other in a chevron configuration and disposed on both said pressure and suction sidewalls in said one channel, and said chevron turbulators in said one channel are slanted oppositely to each other on said sidewalls.

25. A blade according to claim 14 wherein said rows of first and second turbulators are disposed in fewer than all of said flow channels.

26. A blade according to claim 14 wherein said rows of first and second turbulators are disposed in all of said flow channels.

27. A blade according to claim 26 wherein said first turbulators are oblique to said second turbulators.

28. A blade according to claim 27 wherein:

said first and second turbulators on said suction sidewall are higher in span at said midplanes of said channels than at said partitions; and said pressure sidewall includes corresponding rows of oblique first and second slant turbulators being lower in span at said midplanes of said channels than at said partitions.

* * * * *